US010719845B2

(12) United States Patent
Nair

(10) Patent No.: US 10,719,845 B2
(45) Date of Patent: Jul. 21, 2020

(54) MARKETPLACE-LIKE PRESENTATION SYSTEM

(71) Applicant: PAYPAL, INC., San Jose, CA (US)

(72) Inventor: Rahul Nair, Austin, TX (US)

(73) Assignee: PayPal, Inc., San Jose, CA (US)

( * ) Notice: Subject to any disclaimer, the term of this patent is extended or adjusted under 35 U.S.C. 154(b) by 247 days.

(21) Appl. No.: 15/197,411

(22) Filed: Jun. 29, 2016

(65) Prior Publication Data
US 2018/0005259 A1 Jan. 4, 2018

(51) Int. Cl.
G06Q 30/02 (2012.01)
H04L 29/08 (2006.01)
H04L 29/06 (2006.01)
G06F 3/0482 (2013.01)
H04L 12/58 (2006.01)

(52) U.S. Cl.
CPC ....... G06Q 30/0236 (2013.01); G06F 3/0482 (2013.01); G06Q 30/0239 (2013.01); H04L 51/18 (2013.01); H04L 63/08 (2013.01); H04L 63/102 (2013.01); H04L 67/02 (2013.01); H04L 67/306 (2013.01); H04L 69/328 (2013.01); H04L 51/22 (2013.01); H04L 67/06 (2013.01); H04L 67/22 (2013.01)

(58) Field of Classification Search
CPC ....................................... G06Q 30/0207–0277
See application file for complete search history.

(56) References Cited

U.S. PATENT DOCUMENTS

| 6,633,850 | B1 * | 10/2003 | Gabbard | G06F 17/211 |
| | | | | 705/1.1 |
| 2003/0009385 | A1 * | 1/2003 | Tucciarone | G06Q 10/107 |
| | | | | 705/26.1 |
| 2006/0277112 | A1 * | 12/2006 | Lieu | G06Q 30/02 |
| | | | | 705/26.1 |
| 2007/0038718 | A1 * | 2/2007 | Khoo | G06Q 10/107 |
| | | | | 709/206 |
| 2008/0307063 | A1 * | 12/2008 | Caughey | G06Q 10/107 |
| | | | | 709/206 |
| 2010/0082427 | A1 * | 4/2010 | Burgener | G06Q 30/02 |
| | | | | 705/14.49 |
| 2012/0047014 | A1 * | 2/2012 | Smadja | G06Q 30/02 |
| | | | | 705/14.53 |
| 2012/0101881 | A1 * | 4/2012 | Taylor | G06Q 20/12 |
| | | | | 705/14.13 |

(Continued)

Primary Examiner — David J Stoltenberg
(74) Attorney, Agent, or Firm — Haynes and Boone LLP

(57) ABSTRACT

Systems and methods for providing a marketplace-like presentation system include a system provider device that receives, through communication over a network with a user device, a request to create a marketplace-like presentation system account. The system provider device may then provide a means for parsing and extracting information (e.g., in the form of an inbox parsing and extractor engine) from email marketing offers in a user webmail account, wherein the means for parsing and extracting interfaces a webmail provider including the user webmail account and a user interface (UI) application, and wherein the means for parsing and extracting extracts information from the email marketing offers. Thereafter, the system provider device may present a marketplace-like interface view displayed via the UI application, wherein the marketplace-like interface view includes at least one listing having the extracted offer information.

20 Claims, 13 Drawing Sheets

(56) References Cited

U.S. PATENT DOCUMENTS

| | | | |
|---|---|---|---|
| 2013/0019262 A1* | 1/2013 | Bhatia | H04N 21/252 725/34 |
| 2013/0117080 A1* | 5/2013 | Madsen | G06Q 10/107 705/14.1 |
| 2013/0117098 A1* | 5/2013 | Madsen | G06Q 30/0201 705/14.39 |
| 2013/0185155 A1* | 7/2013 | Colando | G06Q 30/0256 705/14.54 |
| 2014/0074584 A1* | 3/2014 | Fisher | G06Q 30/0207 705/14.39 |
| 2015/0032824 A1* | 1/2015 | Kumar | H04L 51/06 709/206 |
| 2015/0100437 A1* | 4/2015 | Guo | G06Q 10/107 705/14.73 |
| 2015/0100894 A1* | 4/2015 | Kumar | H04L 51/06 715/752 |
| 2015/0256499 A1* | 9/2015 | Kumar | H04L 51/28 709/206 |
| 2015/0278856 A1* | 10/2015 | Khoo | G06Q 10/107 705/14.49 |
| 2016/0132937 A1* | 5/2016 | Khoo | G06Q 10/107 705/14.66 |
| 2017/0034101 A1* | 2/2017 | Kumar | H04L 51/06 |
| 2017/0148046 A1* | 5/2017 | Akbarpour Mashadi | G06Q 30/0239 |
| 2017/0255981 A1* | 9/2017 | Van Niekerk | G06Q 30/0277 |
| 2017/0345076 A1* | 11/2017 | Nair | G06Q 30/0282 |

\* cited by examiner

FIG. 8

MARKETPLACE-LIKE PRESENTATION SYSTEM

BACKGROUND

The present disclosure generally relates to a marketplace-like presentation system, and more particularly to a system that parses and extracts offers from electronic mail to provide the marketplace-like presentation system on a graphical user interface (GUI).

More and more individuals rely on electronic networks, such as the Internet, for a variety of services including purchasing products (e.g., from merchants and/or individuals), to exchange electronic mail, to conduct audio and/or video conferencing, to participate in online chats, to browse the World Wide Web, to play games, for electronic banking, and for electronic file storage and access, among others. Considering the case of purchasing products, a very popular and effective marketing strategy includes sending promotional offers and/or other marketing materials to an individual's inbox via electronic mail (email), also known as "email marketing". Such offers may be sent by a merchant, by an electronic commerce (e-commerce) marketplace offering merchant deals (e.g., Groupon of Chicago, Ill.; Living Social of Washington, D.C.; or other such deal aggregators), as well as by other online marketplace platforms, such as eBay Inc., of San Jose, Calif., Amazon.com Inc. of Seattle, Wash., and Alibaba Group Holding Limited, which operates Alibaba.com, of Hangzhou, Zhejiang, China, among others.

In various examples, a user may sign up to receive email marketing offers from many different merchants, e-commerce marketplaces, and/or other online marketplace platforms. As a result, such a user may receive many email marketing offers from a variety of different sources, for example, on a daily or weekly basis. In many cases, no matter how much an individual may be interested in such email marketing offers, the volume of email received can make it difficult and/or frustrating to a user to open each individual email to read about each offer. In other cases, a user may read a subject line of a particular email marketing offer and quickly dismiss (e.g., delete) that message as uninteresting, when in fact there may have been another offer embedded within the email that could have been of interest, but the user chose not to open the message. In still other examples, a user frustrated with receiving so many emails may simply unsubscribe from receiving email marketing offers, and thus a merchant may lose a potential customer.

Thus, there is a need for a marketplace-like presentation system that parses and extracts offers from electronic mail to provide the marketplace-like presentation system.

BRIEF DESCRIPTION OF THE FIGURES

Figure 8:
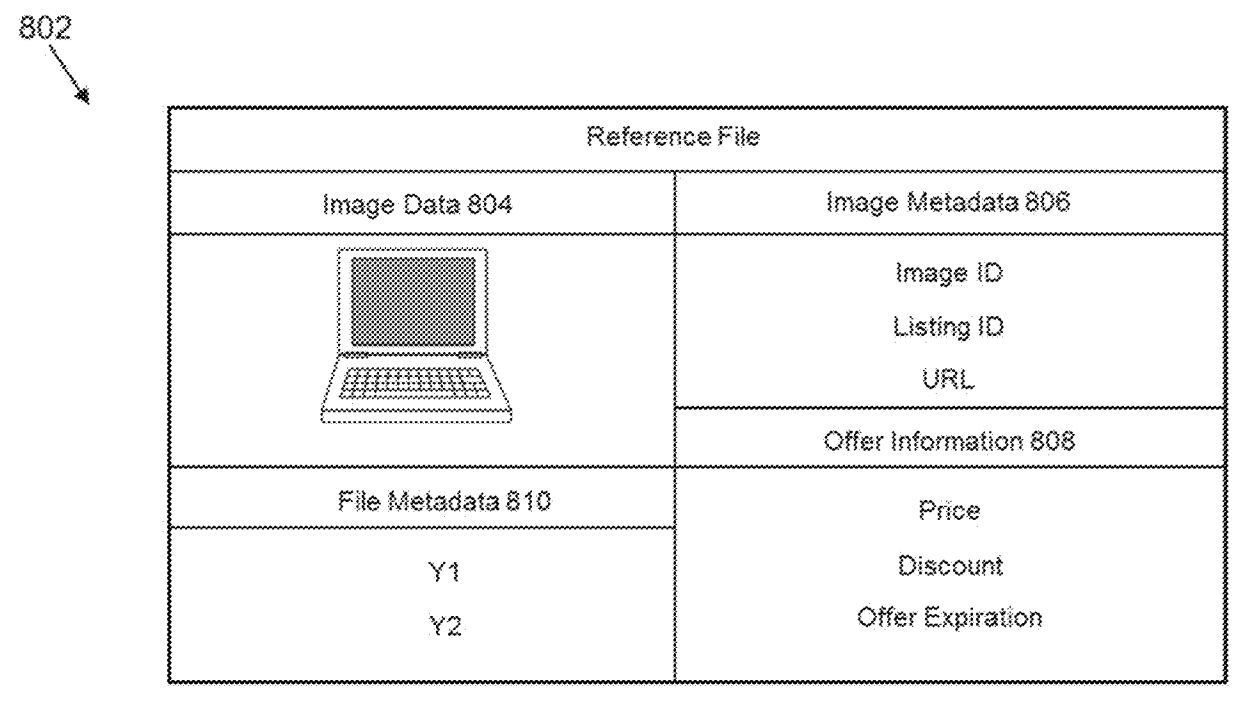

FIG. 8 illustrates an example of a reference file, in accordance with some embodiments;

Figure 1:
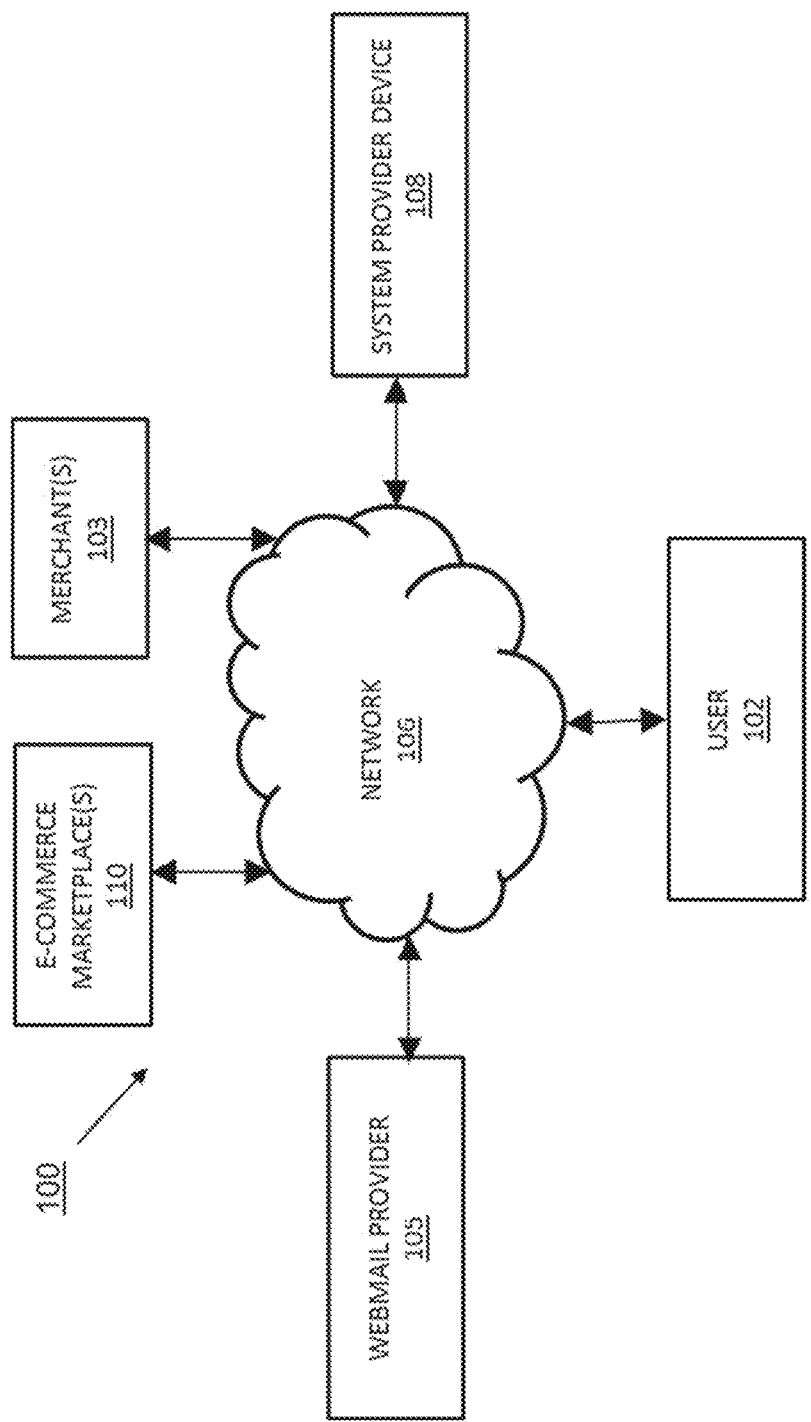
FIG. 1 is a schematic view illustrating a marketplace-like presentation system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing a marketplace-like presentation system that parses and extracts offers from electronic mail to provide the marketplace-like presentation system, such as on a graphical user interface (GUI) of a computer device. Additionally, embodiments described herein may be equally applicable to any type of user (e.g., individual, customer, merchant, or other type of user) operating any type of computing device such as a laptop, a desktop, a mobile device, or other appropriate computing device, and where the computing device is able to access the Internet (e.g., through an Internet connection). Additionally, in various embodiments, the computing device(s) described herein may execute a mobile application that provides for one or more aspects of the marketplace-like presentation system discussed below.

Among other uses, individuals increasingly rely on electronic networks, such as the Internet, for purchasing products and/or services (e.g., from merchants and/or individuals). The transactions may take place directly between a conventional or online merchant or retailer and the consumer, and payment is typically made by entering credit card or other financial information. Transactions may also take place with the aid of an online or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

Currently, a very popular and effective marketing strategy includes sending promotional offers and/or other marketing materials to an individual's inbox via electronic mail (email), a practice also known as "email marketing". Such offers may be sent by a merchant, by an electronic commerce (e-commerce) marketplace offering merchant deals (e.g., Groupon of Chicago, Ill.; Living Social of Washington, D.C.; or other such deal aggregators), as well as by other online marketplace platforms, such as eBay Inc., of San Jose, Calif., Amazon.com Inc. of Seattle, Wash., and Alibaba Group Holding Limited, which operates Alibaba.com, of Hangzhou, Zhejiang, China, among others.

By way of example, a user may sign up to receive email marketing offers from many different merchants, e-commerce marketplaces, and/or other online marketplace platforms. As a result, such a user may receive many email marketing offers from a variety of different sources, for example, on a daily or weekly basis. In many cases, no matter how much an individual may be interested in such email marketing offers, the volume of email received can make it difficult and/or frustrating to a user to open each individual email to read about each offer. In other cases, a user may read a subject line of a particular email marketing offer and quickly dismiss (i.e., delete) that message as uninteresting, when in fact there may have been another offer embedded within the email that could have been of interest, but the user chose not to open the message. In still other examples, a user frustrated with receiving so many emails may simply unsubscribe from receiving email marketing offers, and thus a merchant may lose a potential customer.

By providing the marketplace-like presentation system as described herein, a user is provided with a system that parses and extracts offers from electronic mail to provide the marketplace-like presentation system. For example, in accordance with embodiments described herein, a user may receive email marketing offers, as discussed above, delivered to one or more webmail accounts which the user has used to sign up for such email marketing offers. In various examples, the one or more webmail accounts may include a Gmail account provided by Google of Menlo Park, Calif., a Yahoo Mail account provided by Yahoo Inc. of Sunnyvale, Calif., and/or an AOL Mail account provided by AOL Inc. of New York, N.Y., among others. Thus, an interface or display is transformed from one state (e.g., an email inbox) to a second state (marketplace listing) that enables the user to more easily conduct transactions from the user's computing device. For example, the user does not need to select an offer from the email, be redirected to another site, return back to the email, select a different offer, be directed to a different site and continue this back and forth process to view and possible conduct transactions based on offers from the emails. Instead, the user is presented with an easy-to-manage page with multiple offers from different emails to view and conduct transactions with.

In various embodiments, the marketplace-like presentation system disclosed herein may include a web browser plug-in or email application. By way of example, the web browser plug-in or email application may provide a button, accessible via a user interface (UI), which upon clicking provides a marketplace-like interface, from which the user may browse and/or purchase items or services in a more convenient manner. In particular, upon activating the marketplace-like presentation system (e.g., by clicking the provided button), an inbox parsing and extractor engine as shown and described in FIG. 6, may search through a user's email, looking for key words and phrases (e.g., "deal", "offer", "sale", "10% off", etc.). Emails containing such key words and phrases may be flagged, and the inbox parsing and extractor engine may then additionally search for, and extract from the flagged emails, a variety of information such as offer images, offer uniform resource locators (URLs) (e.g., which may be associated with an offer image), an offer price and/or discount, offer distance, offer expiration, and/or other pertinent offer information. Thereafter, the inbox parsing and extractor engine may provide the extracted offer information to a presentation module for appropriate formatting and presentation, for example, via a UI (e.g., a mobile device display, a laptop display, a tablet display, or a desktop display, among others). In some examples, the inbox parsing and extractor engine may itself be used to implement the presentation module, and provide the extracted and formatted offer information to the UI. In some embodiments, the marketplace-like presentation system disclosed herein may further provide a search functionality, as discussed below, allowing the user to search offers via the provided marketplace-like interface. Various other embodiments and advantages of the present disclosure will become evident in the discussion that follows and with reference to the accompanying figures.

Referring now to FIG. 1, an embodiment of a marketplace-like presentation system 100 is illustrated. The marketplace-like presentation system 100 includes a user 102. In various embodiments, the user 102 may include any type of user (e.g., individual, customer, merchant, or other type of user) operating any type of computing device such as a laptop, a desktop, a mobile device, or other appropriate computing device. While the embodiments herein are generally shown and described with reference to a single user (e.g., user 102) for the sake of clarity, it will be understood that various embodiments may include a plurality of users at a plurality of user physical locations. In various examples, the user 102 includes, corresponds to, or is associated with one or more user devices (e.g., such as the computing devices described above) that are coupled to a network 106 that is further coupled to a system provider device 108. For example, the user 102 and the system provider device 108 are configured to communicate with one another by way of the network 106, for example by way of network communication devices, as discussed below.

In various examples, the embodiment of the marketplace-like presentation system 100 further includes an e-commerce marketplace 110. The e-commerce marketplace 110 may include an e-commerce marketplace offering merchant deals such as Groupon, Living Social, etc., as well as other online market platforms such as eBay, Amazon, Alibaba, or any of a variety of other online marketplace platforms. More generally, the e-commerce marketplace 110 may include any of a plurality of electronic commerce (e-commerce) websites offering goods and/or services for sale from a merchant to a consumer (e.g., such as the user 102). To be sure, in some examples, the consumer may be another merchant, an individual customer, or other type of user. As such, e-commerce marketplace 110 may provide merchandise listings for the goods and/or services being sold. A "merchandise listing", as used herein, may include an image of an item for sale, a description of the item for sale, a price of the item for sale, as well as other relevant item information. In various embodiments, the e-commerce marketplace 110 includes one or more devices that are coupled to the network 106 that is further coupled to a system provider device 108. For example, the e-commerce marketplace 110 and the system provider device 108 are configured to communicate with one another by way of the network 106, for example by way of network communication devices, as discussed below. Moreover, in accordance with various embodiments, the e-commerce marketplace 110 may send email marketing offers (e.g., on behalf of the e-commerce marketplace 110 and/or on behalf of a merchant) to a user (e.g., the user 102).

The marketplace-like presentation system 100 may also include a merchant 103. In various embodiments, the merchant 103 may include a merchant operating a physical merchant location and/or a merchant virtual storefront accessible to a customer via a website (e.g., accessible through an Internet connection using a mobile device and/or a personal computer) or via a mobile application executing on the customer's mobile device. It will be understood that various embodiments may include a single merchant at a single physical location, a plurality of merchants at a plurality of merchant physical locations, a single merchant having a plurality of merchant physical locations, a plurality of merchants operating a plurality of merchant virtual storefronts, and/or a single merchant operating a plurality of merchant virtual storefronts. In various examples, the merchant 103 includes one or more merchant devices that are coupled to the network 106 that is further coupled to a system provider device 108. For example, the merchant 103 and the system provider device 108 are configured to communicate with one another by way of the network 106, for example by way of network communication devices, as discussed below. In some embodiments, the merchant 103 may send email marketing offers directly to a user (e.g., the user 102).

In the embodiments, the merchant 103 may provide a physical location such as a department store, a restaurant, a grocery store, a pharmacy, a movie theater, a theme park, a sports stadium, and/or a variety of other merchant physical locations. Moreover, in some embodiments, the merchant 103 physical location may include a mobile merchant location such as a cart, kiosk, trailer, and/or other mobile merchant locations. In addition, in various embodiments, the merchant 103 may include a virtual storefront that serves to complement the merchant physical location. In still other embodiments, the merchant 103 may not include a merchant physical location, and may instead only include a merchant virtual storefront, as described above. Oftentimes, the merchant 103 may offer items for sale by way of merchandise listings provided via the e-commerce marketplace 110. In some cases, the merchant 103 may alternatively, or additionally, offer items for sale by way of merchandise listings provided via a merchant's own virtual storefront (e.g., accessible through a merchant website).

The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the user 102 may communicate through the network 106 via cellular communication, by way of one or more user network communication devices. In other examples, the user 102 may communicate through the network 106 via wireless communication (e.g., via a WiFi network), by way of one or more user network communication devices. In yet other examples, the user 102 may communicate through the network 106 via any of a plurality of other radio and/or telecommunications protocols, by way of one or more user network communication devices. In still other embodiments, the user 102 may communicate through the network 106 using a Short Message Service (SMS)-based text message, by way of one or more user network communication devices.

The system provider device 108 may likewise couple to the network 106 via a wired or wireless connection. As described in more detail below with reference to FIG. 14, the system provider device 108 may include an inbox parsing and extractor engine, a communication engine, a user database, and a webmail provider database. Software or instructions stored on a computer-readable medium, and executed by one or more processors of the system provider device 108, allows the system provider device 108 to send and receive information over the network 106. Furthermore, the inbox parsing and extractor engine in the system provider device 108 may be configured to implement the various embodiments of the marketplace-like presentation system as described herein. In some examples, the system provider device 108 is configured to receive a request (e.g., from a user) to create marketplace-like presentation system account or to manage such an account. In some embodiments, as part of the creation of the marketplace-like presentation system account the system provider device 108 may suggest initial settings for the marketplace-like presentation system. For example, in some cases, the marketplace-like presentation system may be configured to retrieve all offers embedded within a user's email (e.g., inbox). Alternatively, in various embodiments, the marketplace-like presentation system may be configured to preferentially retrieve offers in which the user has a particular interest (e.g., as defined by a user configuration of the marketplace-like presentation system), time-sensitive offers, and/or other selected offers. Various other marketplace-like presentation system configuration settings may similarly be used, without departing from the scope of the present disclosure. In some examples, whether or not the system provider device 108 suggests an initial marketplace-like presentation system configuration, the user may manually select a desired marketplace-like presentation system configuration (e.g., during account setup, during plug-in installation, or at any time thereafter).

As illustrated in FIG. 1, one or more webmail providers 105 may likewise couple to the network 106 via a wired or wireless connection. As described above, the webmail providers 105 may include email service providers such as Gmail, Yahoo Mail, AOL Mail, and/or other webmail providers as known in the art. As such, the webmail providers 105 may communicate data (e.g., email, authentication information, metadata, file attachments, or other webmail-available data) to the system provider device 108.

In addition, in some embodiments, the system provider (e.g., operating the system provider device 108) may include a payment service provider such as, for example, PayPal Inc. of San Jose, Calif., that provides the marketplace-like presentation system 100 for the user 102, as well as any other users implementing the marketplace-like presentation system 100. Information sent and received through the network 106, user devices, and webmail providers 105 may be associated with user 102 accounts in a database located in a non-transitory memory, and any use of that information may be stored in association with such user 102 accounts. Furthermore, the payment service provider may provide the marketplace-like presentation system 100 for a plurality of different users, similarly as described for the user 102, discussed below. Thus, references to a system provider operating a system provider device below may refer to a payment service provider operating a payment service provider device, or may refer to any other entity providing a marketplace-like presentation system separate from or in cooperation with a payment service provider.

Figure 2:
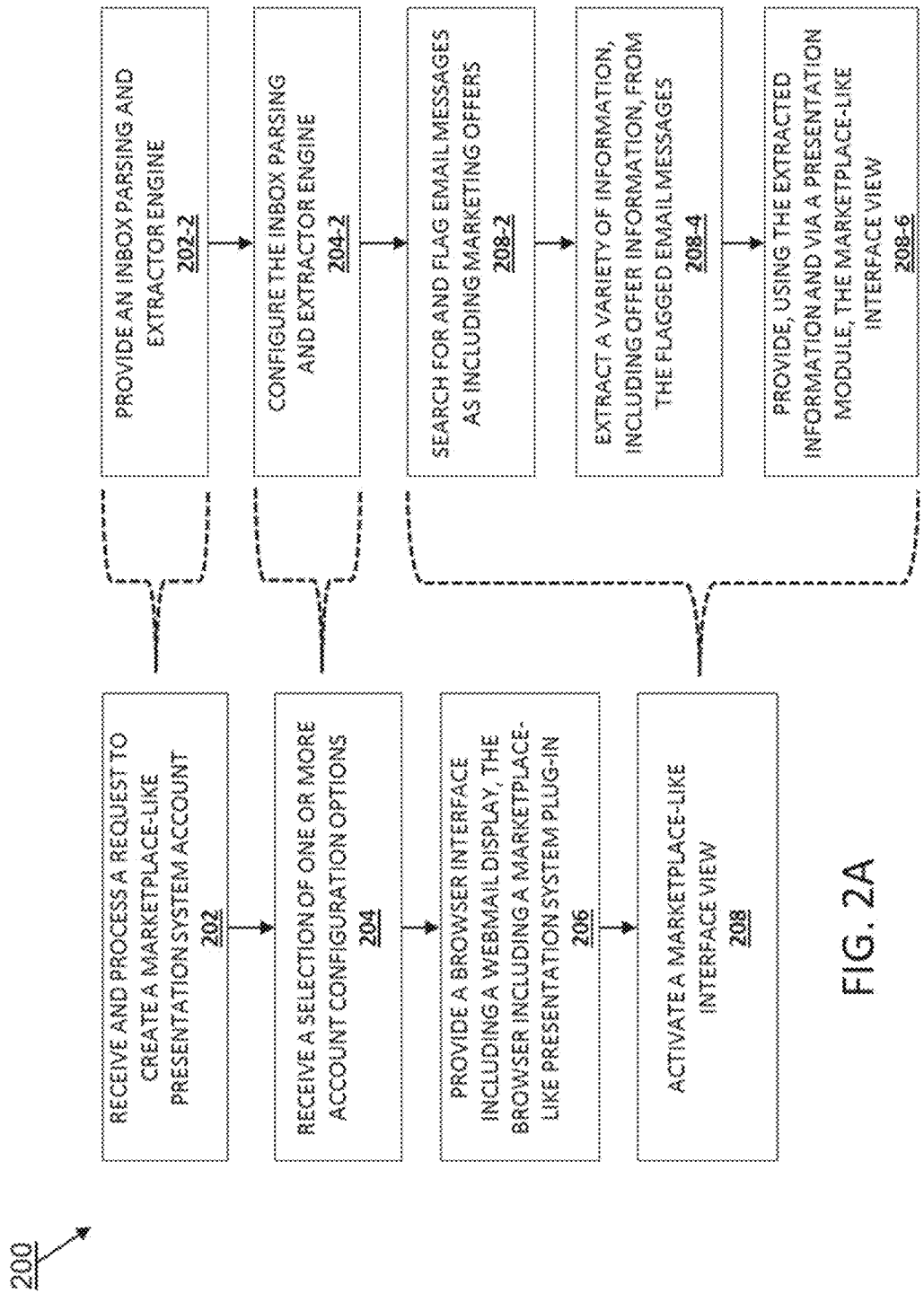
FIGS. 2A and 2B are flow charts illustrating an embodiment of a method for providing a marketplace-like presentation system that parses and extracts offers from electronic mail to provide the marketplace-like presentation system.

Referring now to FIGS. 2A/2B, an embodiment of a method 200 for providing a marketplace-like presentation system that parses and extracts offers from electronic mail to provide the marketplace-like presentation system is illustrated. In some embodiments, steps in FIG. 2A of the method 200 include steps directly related to or involving a user of the marketplace-like presentation system 100 (e.g., receiving a request, selection, or other input from a user, or providing/displaying a marketplace-like interface to the user). In some examples, steps in FIG. 2B of the method 200 include back-end steps, which while related to the steps shown in FIG. 2A, may not necessarily be visible to the user of the marketplace-like presentation system 100. One of skill in the art in possession of the present disclosure will recognize that the method 200 may be performed for a plurality of different users at a variety of physical locations. It will also be understood that additional steps may be performed before, during, and/or after the steps described below with reference to the method 200. In particular, with reference to FIGS. 3-10, various aspects of the method 200 are illustrated and described.

Figures 3, 4:
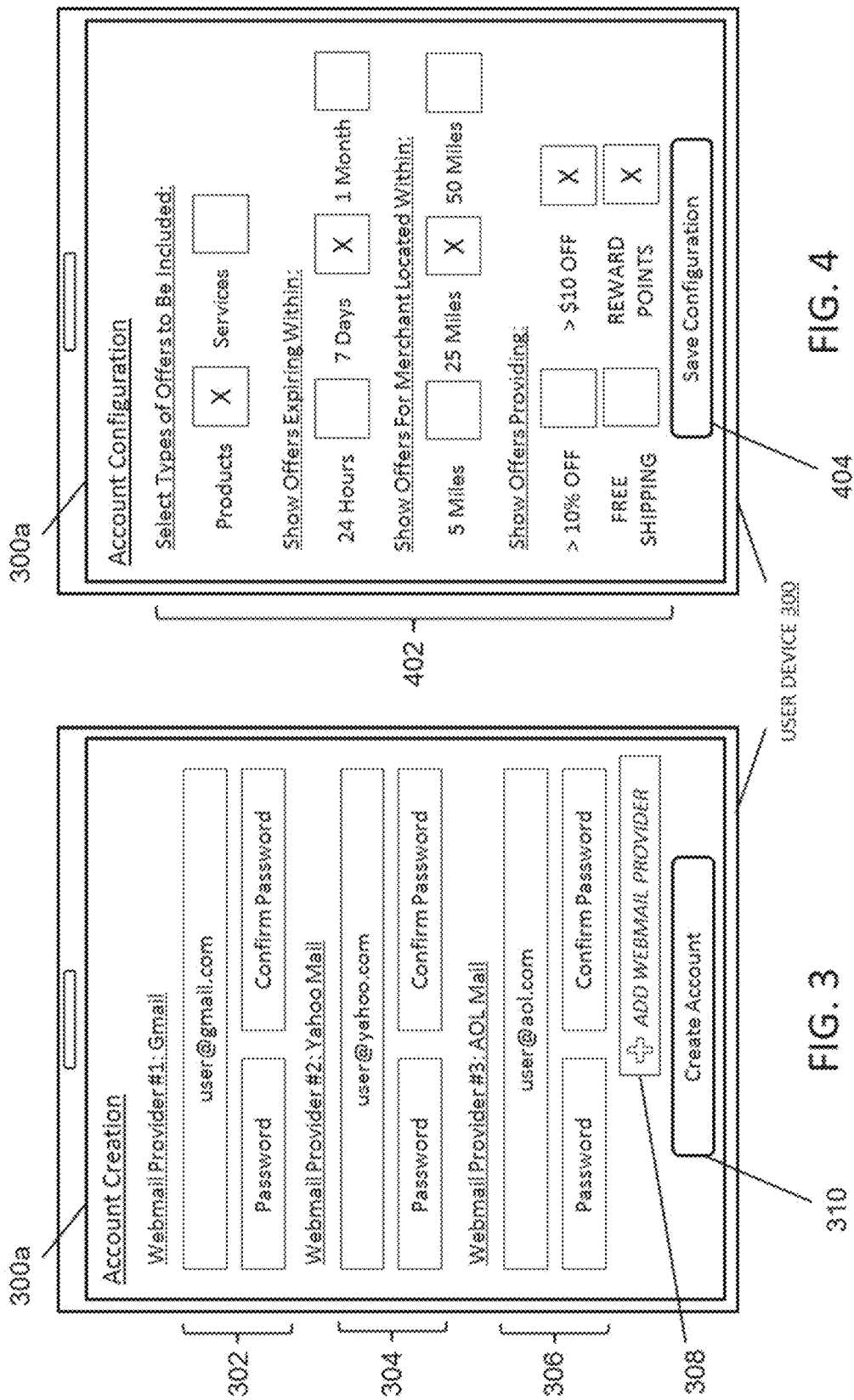
FIG. 3 illustrates an embodiment of a user device including a screen shot displaying an account creation screen.
FIG. 4 illustrates an embodiment of a user device including a screen shot displaying an account configuration screen.

The method 200 begins at block 202 where a request to create a marketplace-like presentation system account is received (e.g., from a user) and processed, thereby creating the marketplace-like presentation system account. In some embodiments, creation of the marketplace-like presentation system accounts may include downloading and installing a plug-in, such as a web browser plugin, thereby providing one or more of the features of the embodiments disclosed herein. Referring first to FIG. 3, a user device 300 is illustrated that includes a display 300a and which may include a touchscreen user interface. The user device 300, in accordance with various embodiments of the present disclosure, may include a laptop computer, a desktop computer, a mobile phone, a tablet, and/or any of a variety of other type of computing device as known in the art. In various embodiments, a user associated with the user device 300 may launch a system provider application and/or a payment service provider application (e.g., a payment application provided by PayPal, Inc. of San Jose, Calif.), for example, to request creation of the marketplace-like presentation system and/or to update, view, or otherwise interact with a previously created marketplace-like presentation system account.

Consider, for example, a user that would like to create a new marketplace-like presentation system account. In some embodiments, with reference to FIG. 3 and in an embodiment of block 202, upon launching the system provider application or upon downloading a marketplace-like presentation system web browser plug-in, the user may be presented with an "Account Creation" screen, as shown in the display 300a. In various examples, a user may be prompted to enter authentication information 302, 304, 306 (e.g., email address or user name, and password), for each webmail account which the user would like the marketplace-like presentation system to access. It should be noted that while the example of FIG. 3 illustrates three webmail provider accounts (e.g., Gmail, Yahoo Mail, and AOL Mail), in some cases, the marketplace-like presentation system account described herein may be created with less or more webmail provider accounts. As also shown in FIG. 3, an "Add Webmail Provider" button 308 may be provided to allow the user to add additional webmail provider accounts. After entering the authentication information 302, 304, 306, the user may select a "Create Account" button 310. Upon selecting the "Create Account" button 310, the request to create the marketplace-like presentation system account, together with the authentication information for each webmail account entered by the user, may be provided to the system provider, and the system provider may use the information to thereby create the marketplace-like presentation system account. In some examples, the authentication information 302, 304, 306, may be provided during account creation, as described above, after which the system provider may continue to have on-going access to each of the webmail accounts until such access is revoked by the user.

Figure 6:
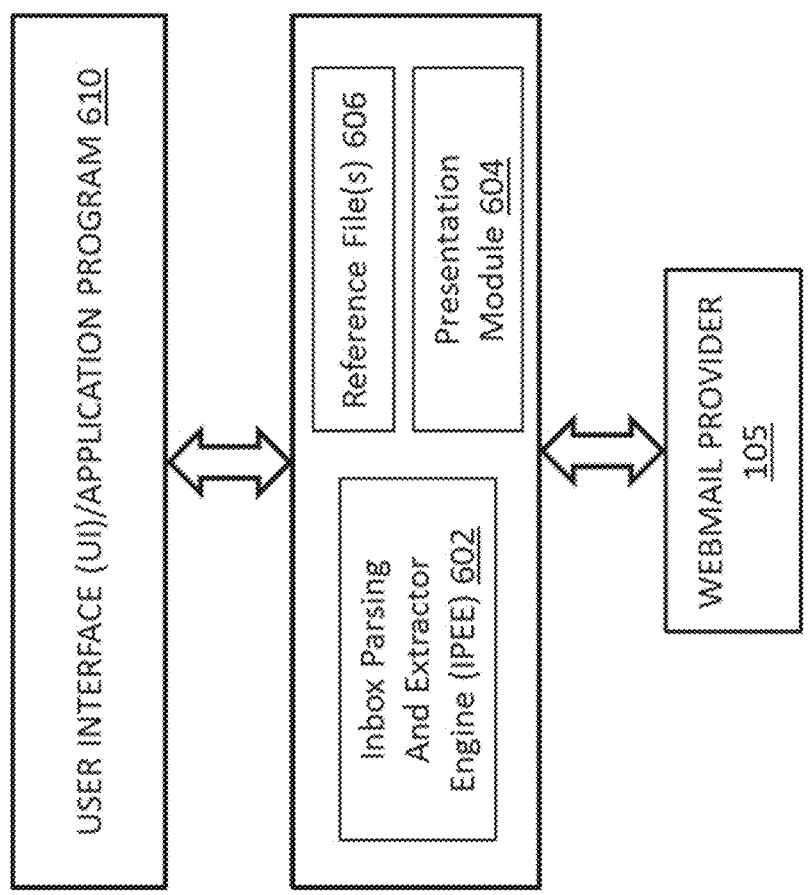
FIG. 6 illustrates an inbox parsing and extractor engine (IPEE) that provides various aspects of the marketplace-like presentation system.

It is noted that creation of the marketplace-like presentation system account of block 202 may further provide an inbox parsing and extractor engine, as shown in related block 202-2 of the method 200. Referring to FIG. 6, and in an embodiment of block 202-2, illustrated therein is an inbox parsing and extractor engine (IPEE) 602 which parses and extracts, from the one or more webmail provider accounts 105, offer information from any of a number of a plurality of marketing emails and presents such offers to the user by way of a user interface (UI), such as a UI 610 (e.g., also shown in FIG. 6). By way of illustration, and in some embodiments, the IPEE 602 may provide a layer of abstraction on top of the webmail provider 105 account which includes an email inbox containing any number of email marketing offers. In various embodiments, IPEE 602 functionality including parsing emails, flagging emails containing offers (e.g., based on key word hits), extracting offer images, URLs, and/or other offer information, and associating offer information to an offer image may be implemented in part by way of one or more data structures including arrays, lists, trees, heaps, hashes, graphs, stacks, queues, buffers, or other data structures as known in the art. In various examples, queries of the various email inboxes may be handled, for example, by a structured query language (SQL) client deployed on top of the IPEE 602. In some cases, such a SQL client may serve as an interface between the UI application and the IPEE 602. Thus, following blocks 202, 202-2 the system provider device has received and processed a request to create the marketplace-like presentation system account using the authentication information for each webmail account submitted by the user.

The method 200 proceeds to block 204 where a selection of one or more account configuration options is received. With reference to the example of FIG. 4, an embodiment of block 204 is illustrated. In some embodiments, after selection of the create account button 310 (FIG. 3), the system provider application may next present the user with an "Account Configuration" screen, as shown in the display 300a of FIG. 4. By way of example, the user may be prompted to select from a plurality of configuration options 402. In some embodiments, the selected options 402 may in turn determine, at least in part, the offers, and related offer information, that are extracted from a user's inbox and displayed as a marketplace-like interface, by the system provider device including the IPEE 602 and the UI of a user device, respectively. For purposes of illustration, the configuration options 402 may include selection of the types of offers to be includes (e.g., products and/or services), offers expiring within a given time-frame (e.g., 24 hours, 7 days, 1 month, etc.), offers for merchants located within a given distance (e.g., radius) from the user (e.g., 5 miles, 25 miles, 50 miles, etc.), offers meeting certain types of other requirements (e.g., providing >10% off, providing >$10 off, providing free shipping, providing reward points, etc.), or other types of suitable configuration options. Moreover, while some examples of information included in the "Account Configuration" screen have been provided, those skilled in the art in possession of the present disclosure will recognize other types of information and/or settings that may be available for user configuration by way of the "Account Configuration" screen, while remaining within the scope of the present disclosure. After entering the account configuration options, the user may select a "Save Configuration" button 404. It is noted that entering the account configuration options in block 204 may further configure the inbox parsing and extractor engine (WEE) 602, as shown in related block 204-2 of the method 200. Thus, following block 204, the system provider device has received a selection of one or more account configuration options. Additionally, in some embodiments, block 204 may be skipped (e.g., after initial creation of the marketplace-like presentation system account at block 202), and instead the "Account Configuration" screen may be called up at a later time by a user interacting with the marketplace-like presentation system 100.

Figure 5:
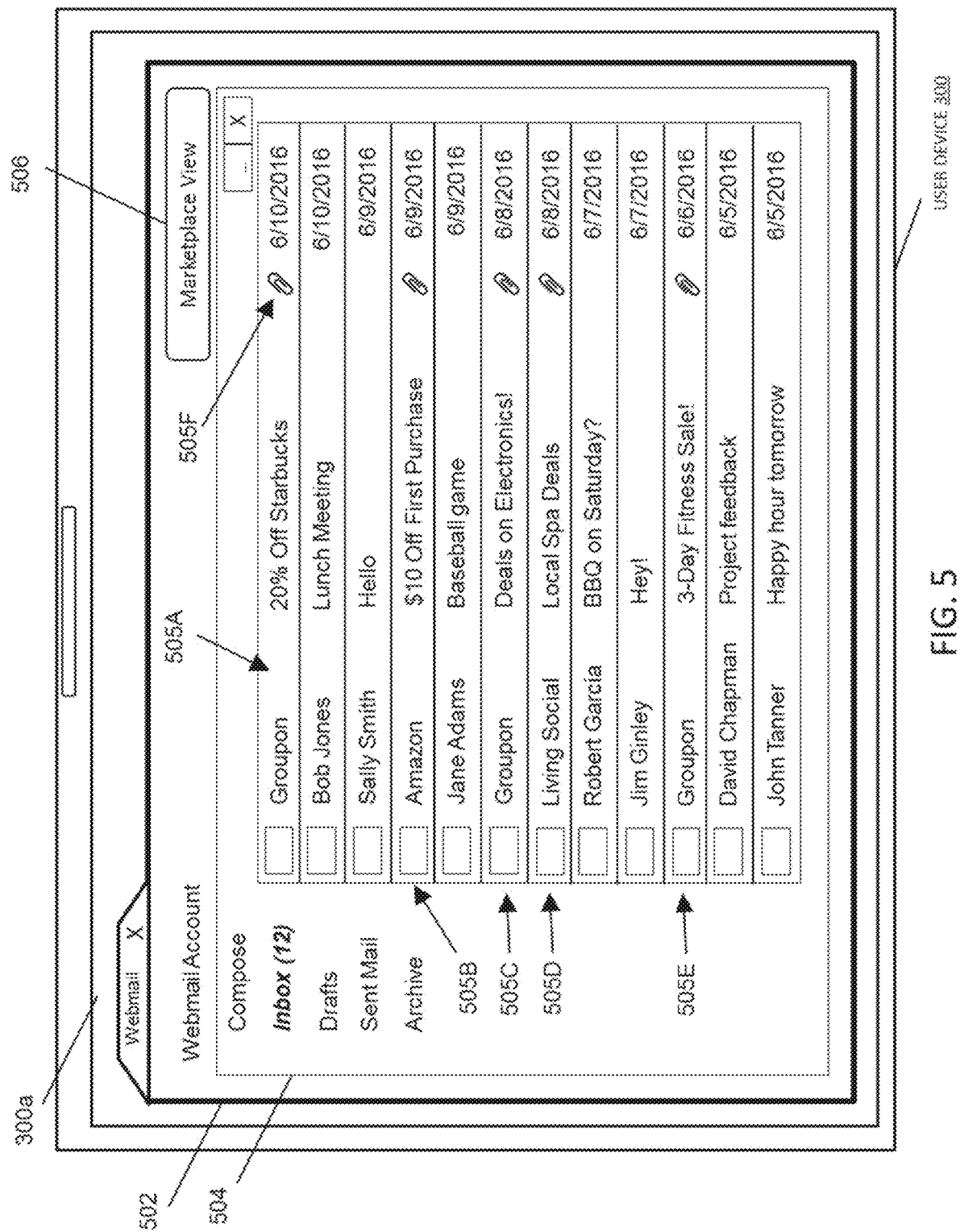
FIG. 5 illustrates a webmail interface including a view of an 'Inbox' email folder, in accordance with some embodiments.

The method 200 proceeds to block 206 where a browser interface including a webmail display is provided, wherein the web browser includes a plug-in capable of implementing embodiments of the marketplace-like presentation system. With reference to the example of FIG. 5, an embodiment of block 206 is illustrated. In particular, FIG. 5 shows a UI in the display 300a of the user device 300 that includes a webmail interface 502 for one of the webmail providers 105 (e.g., Gmail, Yahoo Mail, AOL Mail) including a view 504 of an 'Inbox' email folder for the webmail account a user is accessing, and which the user included during the account creation process (e.g., as shown in FIG. 3). In some embodiments, the UI 610 of FIG. 6 may similarly include the webmail interface 502 UI. As shown in FIG. 5, the webmail interface 502 shows twelve email messages in the user's inbox, five of which are from an e-commerce marketplace. For example, email messages 505A, 505C, and 505E are from Groupon, email message 505B is from Amazon, and email message 505D is from Living Social. Each of the email messages 505A, 505B, 505C, 505D, and 505E also include images (e.g., of offers included within each email message), as indicated by paperclip icons 505F. In various embodiments, the webmail interface 502 also includes a marketplace view button 506 (e.g., provided by the installed browser plug-in), which upon clicking provides a marketplace-like interface, from which the user may browser and/or purchase items or services in a more convenient manner than having to look for email messages containing offers, and open and read each of the email messages containing offers.

The method 200 proceeds to block 208 where a marketplace-like interface view is activated. With reference to the example of FIG. 7, and in embodiment of block 208, a marketplace-like interface 702 including a marketplace-like interface view 704 is illustrated. In some cases, the marketplace-like interface view 704 may be provided in a new browser tab 715, separate from a tab 717 including the webmail interface 502. To be sure, in some cases, the marketplace-like interface view 704 may be provided, for example, as a pop-up window displayed over the webmail interface 502, within the tab 717, without having to create the new tab 715. As described in more detail below, the marketplace-like interface view 704 may include a plurality of listings 708A, 708B, 708C, 708D, which represent offers extracted from the user's email. In some embodiments, the UI 610 of FIG. 6 may include the marketplace-like interface 702 UI. It is also noted that in some embodiments, the marketplace-like interface view 704 may also include a standard webmail view button 706 (e.g., provided by the installed browser plug-in), which upon clicking provides the webmail interface 502, as shown in FIG. 5. Alternatively, in some embodiments, the user may switch back to the webmail interface 502 by simply closing the browser tab 715 (e.g., by clicking the 'X' next to the 'Marketplace' tab name), or by clicking on the tab 717 to make the tab including the webmail interface 502 the active tab.

From the point of view of the user, activating the marketplace-like interface view 704 may appear to happen seamlessly upon clicking the marketplace view button 506 (FIG. 5). However, in actuality, the system provider may perform a plurality of steps to provide the marketplace-like interface view 704. For example, recall that the IPEE 602 is attached/interfaced on one side to the UI 610 (e.g., which may likewise include the browser 502), and the IPEE 602 is attached/interfaced on the other side to the webmail provider 105 that the user is accessing (e.g., as shown in FIG. 5). In general, the IPEE 602 may be attached/interfaced on the other side to any of a plurality of webmail providers 105 which were included in the formation of the marketplace-like presentation system account 100 (e.g., Gmail, Yahoo Mail, AOL Mail). Now consider, by way of example and in an embodiment of block 208, that the user clicks the marketplace view button 506 (FIG. 5) to activate the marketplace-like interface view 704. In response, and in related block 208-2, the system provider (e.g., by way of the IPEE 602) may then search the contents of the user's email inbox, or whatever other email folder is currently active, looking for email marketing offers, which in some cases may be identified by the IPEE 602 by searching for key words and phrases (e.g., "deal", "offer", "sale", "10% off", etc.). In some embodiments, an email marketing offer may contain embedded metadata identifying a particular email as an email marketing offer. Whether identified by key words and phrases, or by metadata, the system provider (e.g., by way of the IPEE 602) may then "flag" emails identified as including email marketing offers.

In various embodiments, a reference file 802 (e.g., shown in FIG. 8) may be provided (e.g., by the system provider) for emails identified (e.g., flagged) as including email marketing offers. In some embodiments, the reference file 802 may include the reference file 606, shown in FIG. 6. By way of example, the reference file 802 may be configured to include image data 804, image metadata 806, offer information 808, and file metadata 810. In some embodiments, the image data 804 includes an offer-related image extracted (e.g., by the IPEE 602) from an identified email marketing offer. In some cases, the image metadata 806 may include any of a variety of identifying information such as an image identification (Image ID), as well as a listing identification (Listing ID), and/or a merchandise listing website link, for the online marketplace providing an offer associated with the image represented by the image data 804. In some embodiments, the image metadata 806 may be provided by the online marketplace (e.g., Groupon, Living Social, Amazon, eBay, Alibaba, etc.), for example, when an image is uploaded to the online marketplace platform during the creation of a merchandise listing. In some examples, the 'File Metadata' 810 may include data used to identify a marketing email message, within a particular webmail account. In various embodiments, the 'File Metadata' 810 may include data entries within an email subject line, within an email body, and/or within an email header, among others. In some embodiments, the offer information 808 may include any of a variety of information such as offer images, offers URLs, (e.g., which may be associated with an offer image), an offer price and/or discount, offer distance, offer expiration, and/or other pertinent offer information. In some embodiments, the offer information 808 may also include offer type information (e.g., identifying offer as a product or service), as well as offer category information (e.g., electronics, home & garden, sports & outdoors, music, video, health & beauty, automotive, books, toys, kids, baby, games, clothing, and jewelry, among others). In various embodiments, some information/data stored in the reference file 802 may be gleaned, and subsequently stored within the reference file 802, during the initial email message search and flag process performed by the IPEE 602. However, in some cases, additional information may be obtained from a subsequent IPEE 602 information extraction process.

In particular, after the search and flag process and in an embodiment of block 208-4, the system provider (e.g., by the IPEE 602) may then additionally search for, and extract from the flagged emails, as much of the reference file 802 data mentioned above as possible, which has not already been captured by the IPEE 602 search and flag process. For example, the IPEE 602 may serve to extract the image data 804, the image metadata 806, the offer information 808, and the file metadata 810. By way of example, the information extracted by the IPEE 602, for each identified email marketing offer, may be saved to the reference file 802, for subsequent presentation to the user (e.g., via a UI). For example, in an embodiment of block 208-6, using the extracted information (e.g., which may now be saved to the reference file 802) and in cooperation with the presentation module 604 (FIG. 6), the system provider (e.g., by the presentation module 604) may then appropriately format and present the marketplace-like interface view 704 via a UI (e.g., a mobile device display, a laptop display, a tablet display, or a desktop display, among others). In some examples, the IPEE 602 may itself be used to implement the presentation module, and provide the marketplace-like interface view 704 to the UI.

Figure 7:
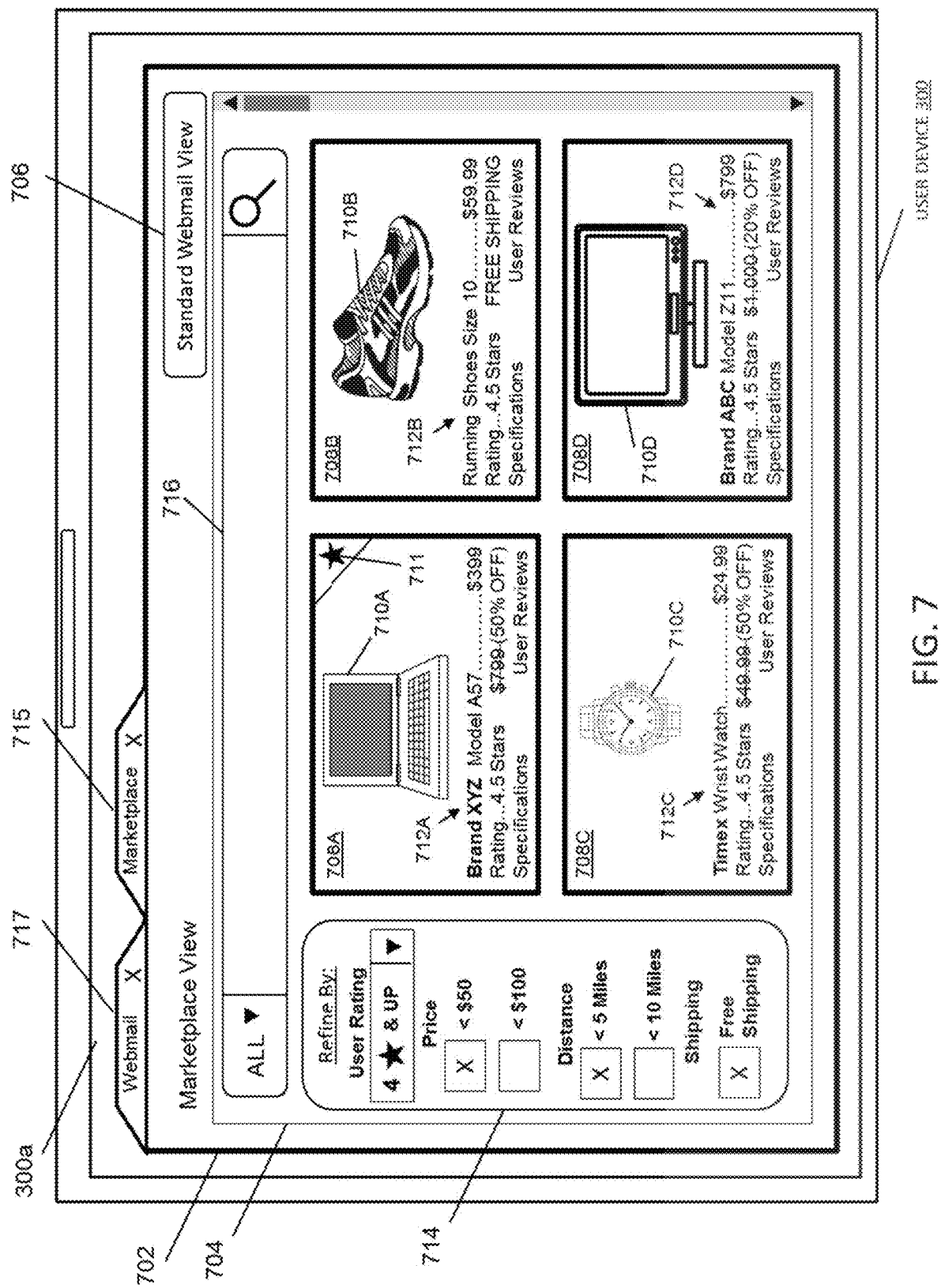
FIG. 7 illustrates a marketplace-like interface, in accordance with some embodiments.

Returning to the example of FIG. 7, additional details regarding the marketplace-like interface view 704 are now provided. As mentioned above, the marketplace-like interface view 704 may include a plurality of listings 708A, 708B, 708C, 708D, which represent marketing offers extracted from the user's email (e.g., such as from the email messages 505A, 505B, 505C, 505D, and 505E of FIG. 5). As shown, each of the plurality of listings 708A, 708B, 708C, 708D may further include an image 710A, 710B, 710C, 710D, as well as offer information 712A, 712B, 712C, 712D. In various embodiments, the images and information shown in each of the plurality of listings 708A, 708B, 708C, 708D may include information previously scraped from a user's email and stored within one or reference files 802. Thus, by way of example, the images 710A, 710B, 710C, 710D may include the image data 804, and the offer information 712A, 712B, 712C, 712D may include the offer information 808, from any of a plurality of reference files 802. In addition, website link (e.g., URLs) data (e.g., stored in the reference files 802) may be associated with any of the images 710A, 710B, 710C, 710D and/or with text provided within the offer information 712A, 712B, 712C, 712D. As such, a user may click on such links (e.g., embedded within an image or text) to be taken to an e-commerce marketplace 110 to complete a purchase transaction. In some cases, the user may click on such links to directly purchase the item shown and/or described directly via the marketplace-like interface view 704.

In some embodiments, one or more of the plurality of listings 708A, 708B, 708C, 708D may also include an identifier 711. By way of example, the identifier 711 may be used to indicate that the item shown in the listing having the identifier 711 (i.e., the listing 708A) is an item in which the user may have a particularly special interest. In various embodiments, the system provider may identify such "special interest" items/listings by any of a variety of different methods. In some cases, the special interest item/listing may include one which meets one or more of the selected account configuration options 402 of FIG. 4. In some examples, the special interest item/listing may include one having an item or service which a user has previously searched for or otherwise shown interest in, as determined for example by cookie data, cache data, web browser history data, temporary data files, or other user-specific data accessible from the user device. In other examples, the special interest item/listing may include time-sensitive offers, for example, as determined by a user calendar accessible via the user device. For instance, the user calendar may include information regarding birthdays, anniversaries, holidays, or other important dates, and the system provider may thus highlight certain listings (e.g., flowers, balloons, spa treatments, etc.) as being of special interest to the user, based at least in part on the calendar information.

Figure 9:
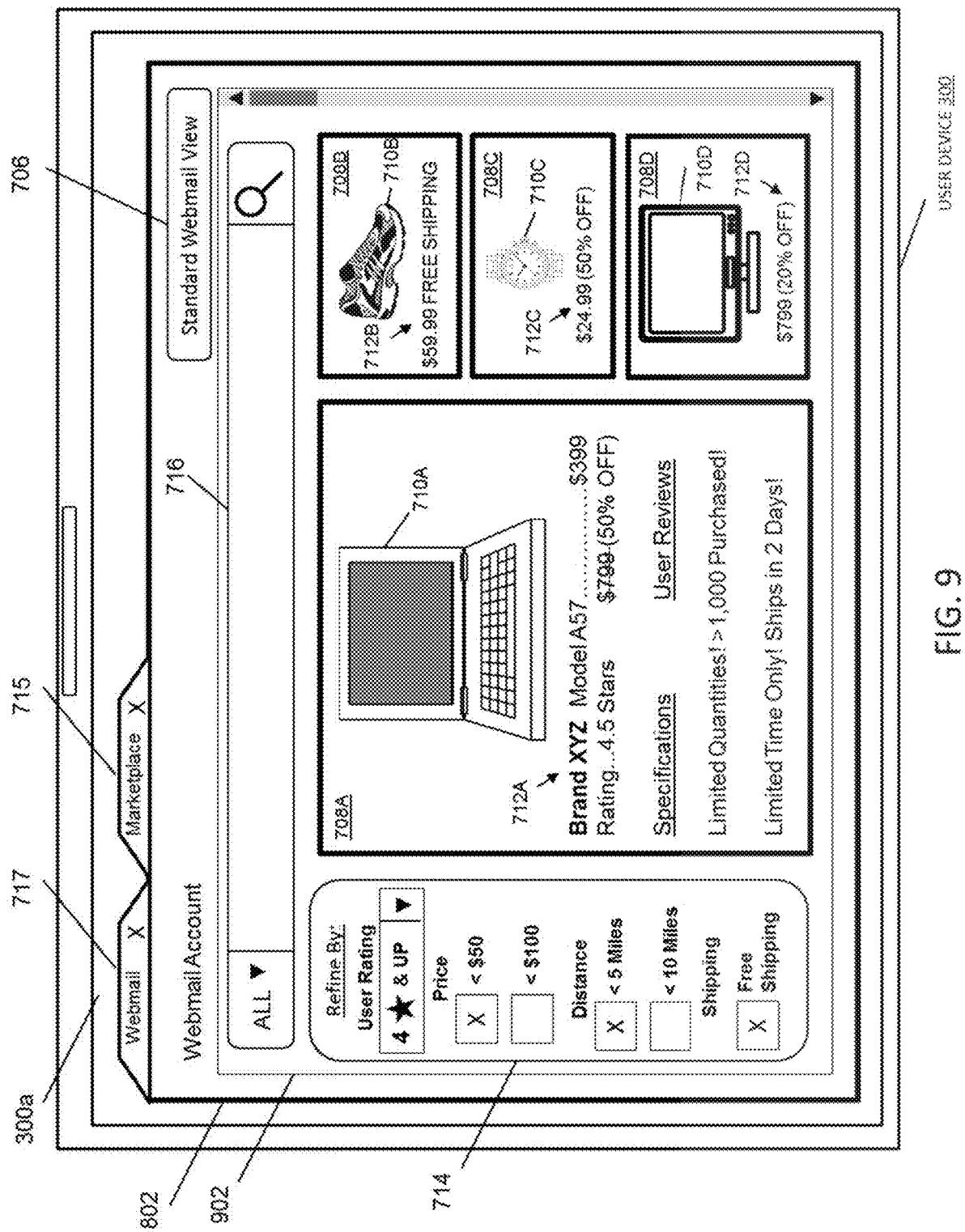
FIG. 9 illustrates an alternative marketplace-like interface, in accordance with some embodiments.

In some cases, rather than or in conjunction with using the identifier 711, the system provider (e.g., in cooperation with the presentation module 604) may use different sized windows for listings that are determined to be of special interest. By way of example, and with reference to FIG. 9, a plurality of listings 708A, 708B, 708C, 708D is shown, each of which include the images 710A, 710B, 710C, 710D, as well as offer information 712A, 712B, 712C, 712D. As shown, the special interest listing 708A, previously identified as such by the identifier 711, is instead shown in a much larger window that the listings 708B, 708C, or 708C of FIG. 9. It is also noted, as shown in FIG. 9, that the offer information 712A for the special interest listing 708A may now provide additional offer details, inasmuch as the window in which the offer is shown is now much larger. On the other hand, the offer information 712B, 712C, 712D for the other listings 708B, 708C, 708D may be now somewhat abbreviated (e.g., as compared to FIG. 7).

In various examples, another feature of the marketplace-like interface view 704 may include an option to filter and/or refine the listings shown in the marketplace-like interface view 704. In some cases, this feature may be provided by a filter menu 714, as shown in FIGS. 7 and 9. In some embodiments, the filter menu 714 may provide for filtering and/or refining the listings shown according to any of a variety of parameters such as user rating, price, distance, whether the listing provides free shipping, or any other appropriate listing filter. In the example of FIGS. 7 and 9, the filter menu 714 indicates that the user wants to see listings having a user rating of four stars and up, listings having a price less than fifty dollars, listings less than five miles away, and listings including free shipping. Thus, while the system provider (e.g., by the IPEE 602, the reference file 802, and the presentation module 604) may have initially provided more listings visible via the marketplace-like interface view 704 as a result of parsing and extracting the user's email, the user may filter the listings shown by activating one or more of the filters available in the filter menu 714.

Figure 10:
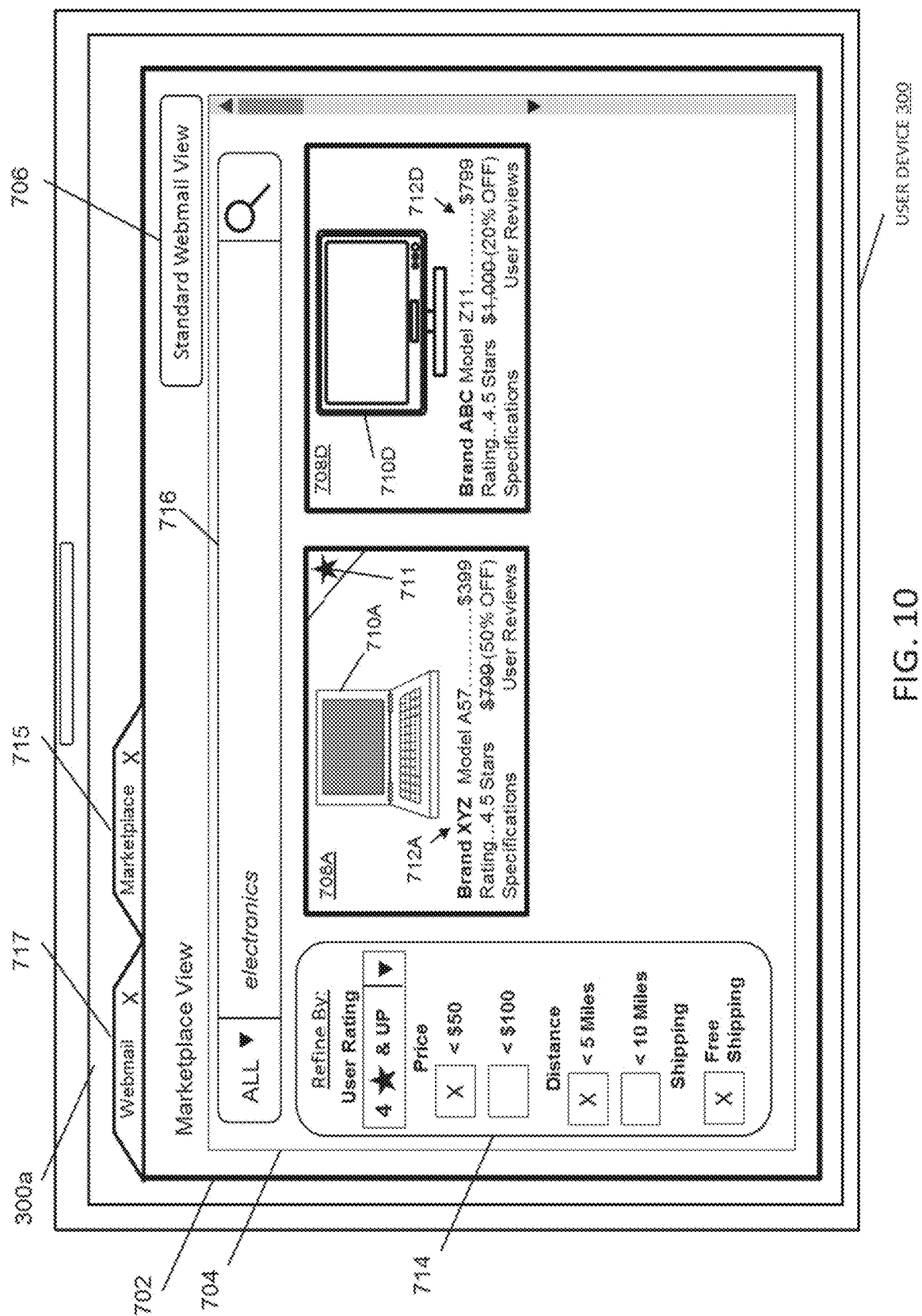
FIG. 10 illustrates a marketplace-like interface having results refined by use of a search function, in accordance with some embodiments.

In some embodiments, the system provider may further provide a search functionality, allowing the user to search offers presented via the marketplace-like interface view 704. For example, as shown in FIGS. 7 and 9, a search bar 716 is provided. In some embodiments, the search bar 716 accepts a user input, where the user input is used by the system provider to query a database, which may include a plurality of reference files 802, each of the plurality of reference files 802 corresponding to a given product and/or service listing. As a result of the user search via the search bar 716, the listings shown via the marketplace-like interface view 704 may be filtered according to the user input. For example, as shown in FIG. 10, a user may enter a phrase such as "electronics" into the search bar 716, and the system provider may thus only display electronics-related listing, such as the listing 708A (e.g., which includes a laptop) and the listing 708D (e.g., which includes a television). It is also noted that the search functionality described may be combined with other filtering/refining options, such as provided by the filter menu 714.

It will be understood that the examples given above, for example with reference to the method 200, are merely exemplary and are not meant be limiting in any way. Moreover, those of skill in the art in possession of this disclosure will recognize that various additional embodiments may be implemented in accordance with the methods described herein, while remaining within the scope of the present disclosure. For example, the above discussion provided a method for searching a user's email, flagging marketing emails, extracting a variety of information including offer information, and presenting such information via a marketplace-like interface on a user device. Such methods, in various embodiments, may be a little computationally intensive, particularly when the marketplace-like presentation system is deployed for use across any of a variety of email/webmail providers using any of a variety of email formats. Thus, in some embodiments, the marketplace-like presentation system may be configured for use with a predefined email format. Merchants, e-commerce marketplaces, and/or other online marketplace platforms may be notified of the predefined email format such that if the merchant/e-commerce marketplaces want to participate (e.g., be seen) by a user using the marketplace-like presentation system, then the merchant/e-commerce marketplaces should provide marketing emails that conform to the predefined email format. As one example of a predefined email format, a first line of the marketing email may include an item or service title, a second line of the marketing email may include a price, a third line may include a description and/or specification, a fourth line may include an offer (e.g., percentage off, dollars off, free gift, free shipping, etc.). In some embodiments, use of such a predefined email format may provide for a more uniform and accurate marketplace-like interface view.

Thus, systems and methods have been described that provide for a marketplace-like presentation system that parses and extracts offers from electronic mail to provide the marketplace-like presentation system. In various embodiments, the marketplace-like presentation system disclosed herein may search through a user's email, looking for key words and phrases indicative of an email marketing offer. Emails containing such key words and phrases may be flagged, and the inbox parsing and extractor engine may then additionally search for, and extract from the flagged emails, a variety of information such as offer images, offer URLs, an offer price and/or discount, offer distance, offer expiration, and/or other pertinent offer information. Thereafter, the inbox parsing and extractor engine may provide the extracted offer information to a presentation module for appropriate formatting and presentation, for example, via a UI (e.g., a mobile device display, a laptop display, a tablet display, or a desktop display, among others). In some examples, the inbox parsing and extractor engine may itself be used to implement the presentation module, and provide the extracted and formatted offer information to the UI. In some embodiments, the marketplace-like presentation system disclosed herein may further provide a search functionality, allowing the user to search offers via the provided marketplace-like interface. Various examples of technological devices and systems that may be used to implement embodiments of the present disclosure are discussed in more detail below with reference to FIGS. 11-14.

Figure 11:
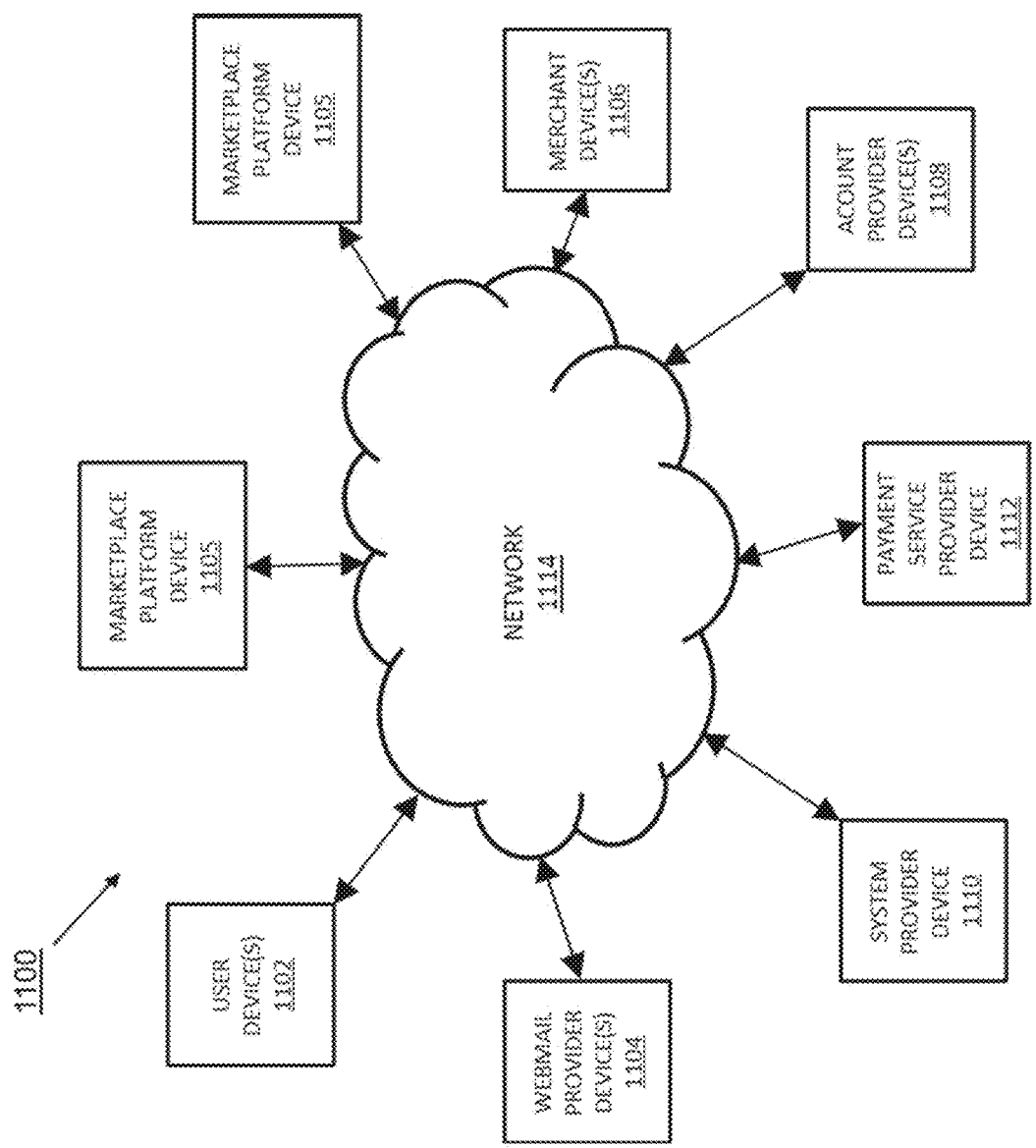
FIG. 11 is a schematic view illustrating an embodiment of a networked system.

Referring first to FIG. 11, an embodiment of a network-based system 1100 for implementing one or more processes described herein is illustrated. As shown, the network-based system 1100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 11 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1100 illustrated in FIG. 11 includes a plurality of user devices 1102, a plurality of webmail provider devices 1104, a plurality of marketplace platform devices 1105, a plurality of merchant devices 1106, a payment service provider device 1112, an account provider device(s) 1108, and/or a system provider device 1110 in communication over one or more networks 1114. The user devices 1102 may be the user devices discussed above and may be operated by the users discussed above. The webmail provider devices 1104 may be the webmail provider devices discussed above and may be operated by the webmail providers discussed above. The marketplace platform devices 1105 may be the marketplace platform devices discussed above and may be operated by the marketplace platforms discussed above. The merchant devices 1106 may be the merchant devices discussed above and may be operated by the merchants discussed above. The payment service provider device 1112 may be the payment service provider devices discussed above and may be operated by a payment service provider such as, for example, PayPal Inc. of San Jose, Calif. The system provider devices 1110 may be the system provider devices discussed above and may be operated by the system providers discussed above, and in some cases may include a payment service provider device operated by a payment service provider such as, for example, PayPal Inc. of San Jose, Calif. The account provider devices 1108 may be operated by credit card account providers, bank account providers, savings account providers, and a variety of other account providers known in the art.

The user devices 1102, webmail provider devices 1104, marketplace platform devices 1105, merchant devices 1106, payment service provider device 1112, account provider device 1108, and/or system provider device 1110 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1114.

The network 1114 may be implemented as a single network or a combination of multiple networks. For example, in various embodiments, the network 1114 may include the Internet and/or one or more intranets, landline networks, wireless networks, and/or other appropriate types of networks.

The user devices 1102, webmail provider devices 1104, marketplace platform devices 1105, merchant devices 1106, payment service provider device 1112, account provider device 1108, and/or system provider device 1110 may be implemented using any appropriate combination of hardware and/or software configured for wired and/or wireless communication over network 1114. For example, in one embodiment, the user devices 1102, webmail provider devices 1104, marketplace platform devices 1105, and/or merchant devices 1106 may be implemented as a personal computer of a user in communication with the Internet. In other embodiments, the user devices 1102, webmail provider devices 1104, marketplace platform devices 1105, and/or merchant devices 1106 may be a smart phone, wearable computing device, laptop computer, and/or other types of computing devices.

The user devices 1102, webmail provider devices 1104, marketplace platform devices 1105, and/or merchant devices 1106 may include one or more browser applications which may be used, for example, to provide a convenient interface to permit the customer to browse information available over the network 1114. For example, in one embodiment, the browser application may be implemented as a web browser configured to view information available over the Internet.

The user devices 1102, webmail provider devices 1104, marketplace platform devices 1105, and/or merchant devices 1106 may also include one or more toolbar applications which may be used, for example, to provide user-side processing for performing desired tasks in response to operations selected by the user. In one embodiment, the toolbar application may display a user interface in connection with the browser application.

The user devices 1102, webmail provider devices 1104, marketplace platform devices 1105, and/or merchant devices 1106 may further include other applications as may be desired in particular embodiments to provide desired features to the user devices 1102, webmail provider devices 1104, marketplace platform devices 1105, and/or merchant devices 1106. The other applications may also include security applications for implementing user-side security features, programmatic user applications for interfacing with appropriate application programming interfaces (APIs) over the network 1114, or other types of applications. Email and/or text applications may also be included, which allow a user to send and receive emails and/or text messages through the network 1114. The user devices 1102, webmail provider devices 1104, marketplace platform devices 1105, and/or merchant devices 1106 may include one or more user and/or device identifiers which may be implemented, for example, as operating system registry entries, cookies associated with the browser application, identifiers associated with hardware of the user devices 1102, webmail provider devices 1104, marketplace platform devices 1105, and/or merchant devices 1106, or other appropriate identifiers, such as a phone number. In one embodiment, the user identifier may be used by the system provider or payment service provider to associate the user with a particular account as further described herein.

The webmail provider devices 1104 may be maintained, for example, by a webmail provider, offering web-based email and/or other services, or over the network 1114. In this regard, the webmail provider device 1104 may include a database including authentication information (e.g., username and passwords) for users having an account with the respective webmail provider operating the webmail provider device 1104.

The merchant devices 1106 and/or marketplace platform devices 1105 may be maintained, for example, by a conventional or online merchant, conventional or digital goods seller, individual seller, e-commerce marketplaces, other online marketplace platforms, and/or application developer offering various products and/or services in exchange for payment to be received conventionally or over the network 1114. In this regard, the merchant device 1106 and marketplace platform devices 1105 may include a database identifying available products and/or services (e.g., collectively referred to as items) which may be made available for viewing and purchase by the user.

The merchant devices 1106 and/or marketplace platform devices 1105 may also include a checkout application which may be configured to facilitate the purchase by the payer of items. The checkout application may be configured to accept payment information from the user through the user devices 1102, the account provider through the account provider device 1108, and/or from the payment service provider through the payment service provider device 1112 over the network 1114. The merchant devices 1106 and/or marketplace platform devices 1105 may also include a system provider application, as described above, to implement one or more aspects of the method 200 and/or other aspects of the various embodiments described herein.

Figure 12:
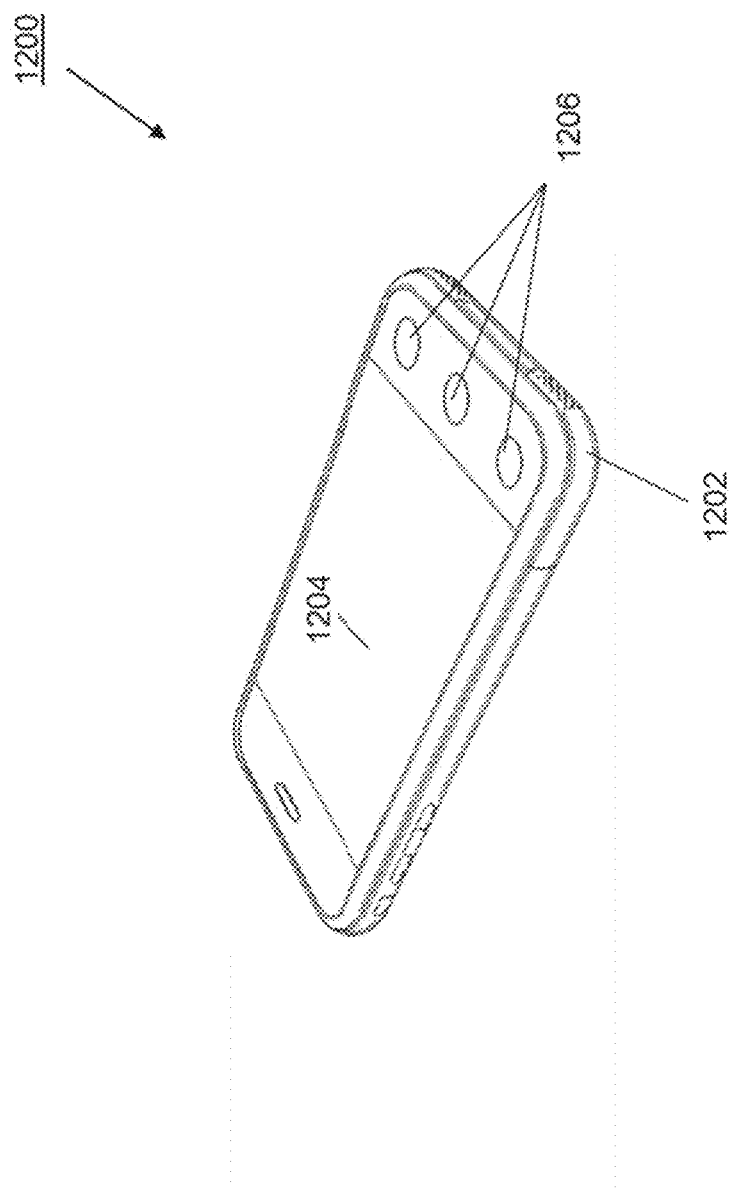
FIG. 12 is a perspective view illustrating an embodiment of a user device.

Referring now to FIG. 12, an embodiment of a user device 1200 is illustrated. The user device 1200 may be the user device 300 or 1102 discussed above. The user device 1200 includes a chassis 1202 having a display 1204 and an input device including the display 1204 and a plurality of input buttons 1206. One of skill in the art will recognize that the user device 1200 is a portable or mobile phone including a touch screen input device and a plurality of input buttons that allow the functionality discussed above with reference to the methods above. However, a variety of other portable/mobile user devices and/or desktop user devices may be used in the methods discussed above without departing from the scope of the present disclosure.

Figure 13:
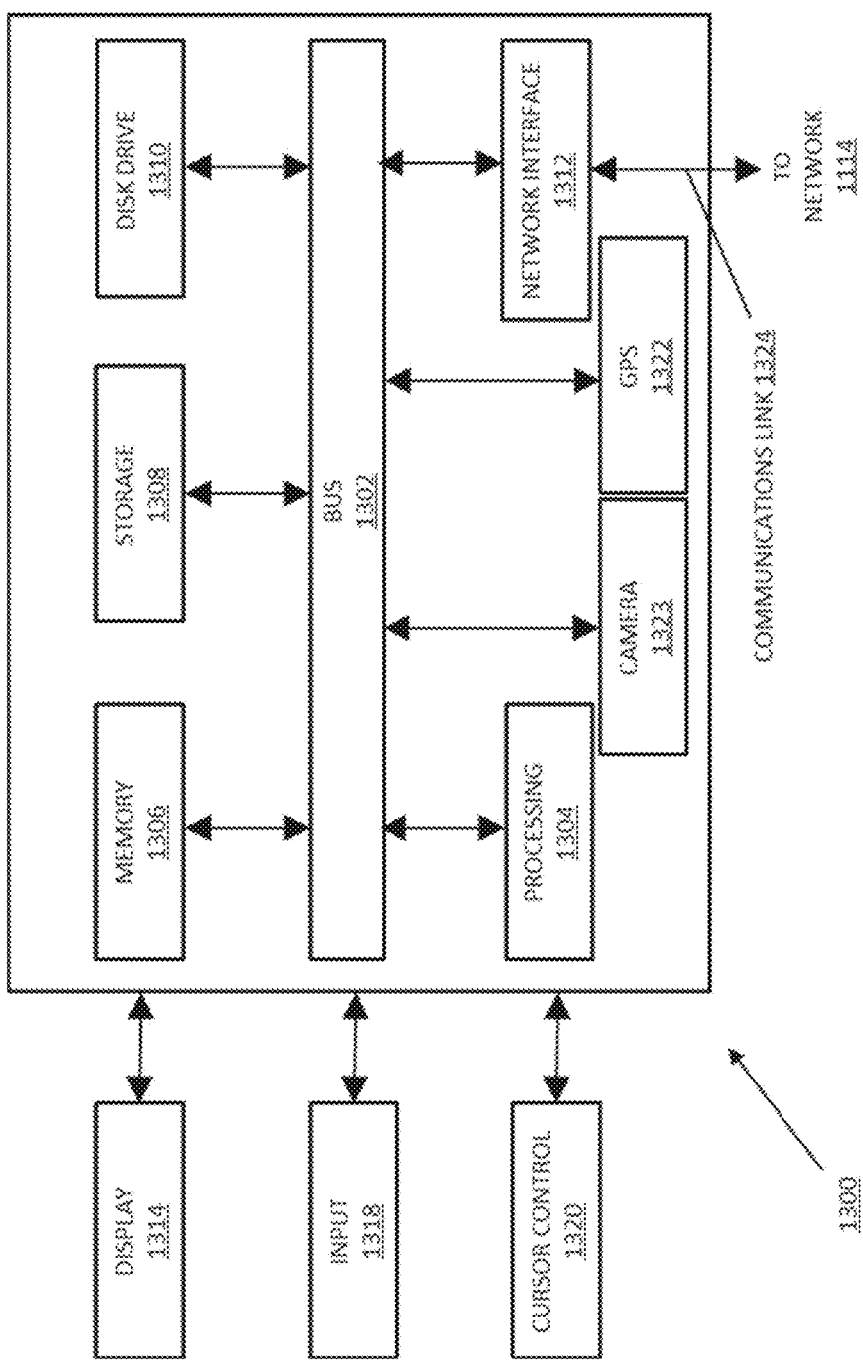
FIG. 13 is a schematic view illustrating an embodiment of a computer system.

Referring now to FIG. 13, an embodiment of a computer system 1300 suitable for implementing, for example, the user devices 300, 1102, 1200, webmail provider devices 1104, marketplace platform devices 1105, merchant devices 1106, payment service provider device 1112, account provider device 1108, and/or system provider device 1110, is illustrated. It should be appreciated that other devices utilized by customers, webmail providers, marketplace platforms, merchants, payment service providers, account providers, and/or system providers in the system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location determination component 1322 (e.g., a Global Positioning System (GPS) device as illustrated, a cell tower triangulation device, and/or a variety of other location determination devices known in the art), and/or a camera component 1323. In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the user devices 300, 1102, 1200, webmail provider devices 1104, marketplace platform devices 1105, merchant devices 1106, payment service provider device 1112, account provider device 1108, and/or system provider device 1110. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1114 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
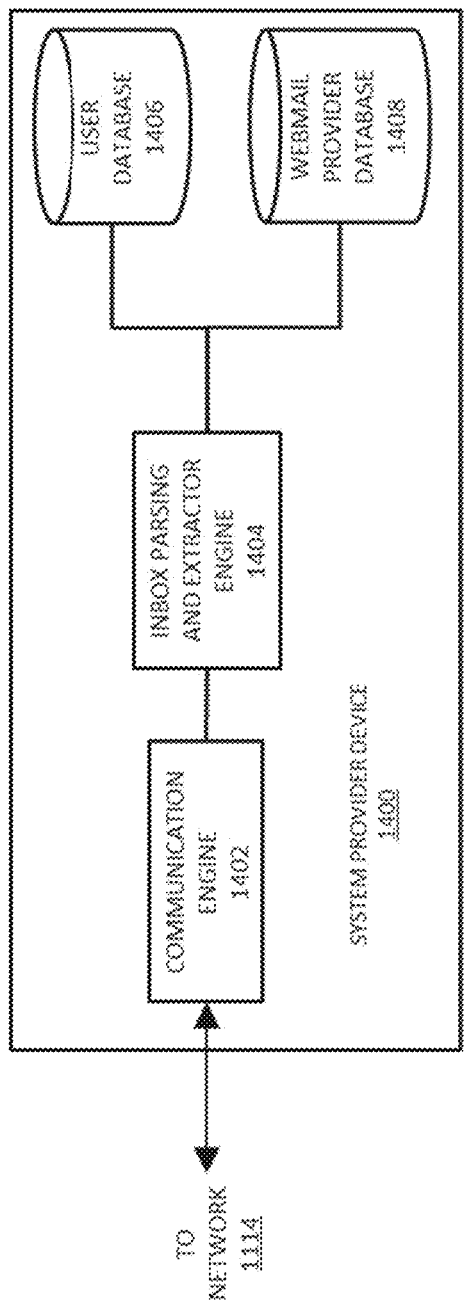
FIG. 14 is a schematic view illustrating an embodiment of a system provider device.

Referring now to FIG. 14, an embodiment of a system provider device 1400 is illustrated. In an embodiment, the device 1400 may be the system provider devices discussed above. The device 1400 includes a communication engine 1402 that is coupled to the network 1114 and to inbox parsing and extractor engine 1404 that is coupled to a user information database 1406 and a webmail provider database 1408. The communication engine 1402 may be software or instructions stored on a computer-readable medium that allows the device 1400 to send and receive information over the network 1114. The inbox parsing and extractor engine 1404 may be software or instructions stored on a computer-readable medium that, when executed by a processor, is configured to receive and process a request to create a marketplace-like presentation system account, receive a selection of one or more account configuration options, provide a browser interface including a webmail display, provide a means for switching from the webmail display to a marketplace-like interface view (e.g., via a browser plug-in and associated button), as well as provide any of the other functionality that is discussed above. While the databases 1406 and 1408 have been illustrated as located in the device 1400, one of skill in the art will recognize that they may be connected to the inbox parsing and extractor engine 1404 through the network 1114 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
determining, via a plug-in of a web browser, that a webmail user interface associated with a user webmail account with a third-party webmail provider is displayed on the web browser of a user device, wherein the user webmail account includes an email inbox comprising a plurality of email messages, and wherein the webmail user interface presents at least a portion of the plurality of email messages included in the email inbox;

in response to the determining, providing, using the plug-in of the web browser on the webmail user interface, a user interface element for activating a marketplace view within the webmail user interface;

accessing, using user authentication information associated with the user webmail account, the plurality of email messages included in the email inbox of the user webmail account;

determining, from the plurality of email messages included in the email inbox of the user webmail account, a subset of email messages associated with a set of deal offers;

extracting deal offer information from the subset of email messages;

generating a plurality of reference files based on the extracted deal offer information, wherein each reference file in the plurality of reference files comprises deal offer information extracted from a corresponding email message from the subset of email messages;

generating the marketplace view based on the extracted deal offer information, wherein the marketplace view includes interactive graphical elements representing the set of deal offers associated with the subset of email messages, wherein a selection of one of the interactive graphical elements redirects the web browser to a merchant webpage for purchasing a product or a service based on a deal offer represented by the interactive graphical element;

in response to receiving a selection of the user interface element, presenting, on the web browser, the marketplace view without redirecting the user away from the webmail user interface;

receiving search criteria via the marketplace view;

querying the plurality of reference files based on the search criteria to identify one or more email messages from the subset of email messages that satisfy the search criteria; and modifying the marketplace view to present the one or more email messages based on the search criteria.

2. The system of claim 1, wherein the operations further comprise:

receiving, from the user, the authentication information associated with the user webmail account prior to the determining that the webmail user interface associated with the user webmail account with the third-party webmail provider is displayed on the web browser of the user device.

3. The system of claim 1, wherein the operations further comprise:

receiving a selection of account configuration options related to deal offer criteria, wherein the subset of email messages is determined from the plurality of email messages further based on the account configuration options.

4. The system of claim 1, wherein each of the plurality of reference files corresponds to a particular deal offer and comprises a Uniform Resource Locator (URL) link associated with a merchant offering the particular deal offer, and wherein the operations further comprise generating an interactive graphical element representing the particular deal offer based at least in part on the URL link.

5. The system of claim 1, wherein the operations further comprise identifying at least one deal offer of a first type from the set of deal offers based on predetermined criteria.

6. The system of claim 5, wherein the marketplace view is configured to present a first interactive graphical element representing the deal offer of the first type in a larger size than other interactive graphical elements.

7. The system of claim 1, wherein the marketplace view further includes a search bar for conducting a search within the set of deal offers, and wherein the search criteria are received via the search bar.

8. The system of claim 1, wherein the deal information is extracted according to a predefined email marketing offer format.

9. A method comprising:

determining, by one or more hardware processors via a plug-in of a web browser, that a webmail user interface associated with a user webmail account with a third-party webmail provider is accessed by the web browser of a user device, wherein the user webmail account includes an email inbox comprising a plurality of email messages, and wherein the webmail user interface presents at least a portion of the plurality of email messages included in the email inbox;

in response to the determining, providing, by the one or more hardware processors using the plug-in of the web browser on the webmail user interface, a user interface element for activating a marketplace view within the webmail user interface;

accessing, by the one or more hardware processors using user authentication information associated with the user webmail account, the plurality of email messages included in the email inbox of the user webmail account;

determining, by the one or more hardware processors from the plurality of email messages included in the email inbox of the user webmail account, a subset of email messages associated with a set of deal offers;

extracting, by the one or more hardware processors, deal offer information from the subset of email messages;

generating a plurality of reference files based on the extracted deal offer information, wherein each reference file in the plurality of reference files comprises deal offer information extracted from a corresponding email message from the subset of email messages;

generating, by the one or more hardware processors, the marketplace view based on the extracted deal offer information, wherein the marketplace view includes interactive graphical elements representing the set of deal offers associated with the subset of email messages, wherein a selection of one of the interactive graphical elements redirects the web browser to a merchant webpage for purchasing a product or a service based on a deal offer represented by the interactive graphical element;

in response to receiving a selection of the user interface element, presenting, on the web browser, the marketplace view;

receiving search criteria via the marketplace view;

querying the plurality of reference files based on the search criteria to identify one or more email messages from the subset of email messages that satisfy the search criteria; and modifying the marketplace view to present the one or more email messages based on the search criteria.

10. The method of claim 9, further comprising:
receiving, by the one or more hardware processors from the user, the authentication information the user webmail account prior to the determining that the webmail user interface associated with the user webmail account with the third-party webmail provider is displayed on the web browser of the user device.

11. The method of claim 9, further comprising:
receiving, by the one or more hardware processors, a selection of account configuration options related to deal offer criteria, wherein the subset of email messages is determined from the plurality of email messages further based on the account configuration options.

12. The method of claim 9, wherein the deal offer information extracted from each of the subset of email messages corresponds to a particular deal offer and comprises a Uniform Resource Locator (URL) link associated with a merchant offering the particular deal offer, and wherein the method further comprises generating an interactive graphical element representing the particular deal offer based at least in part on the URL link.

13. A non-transitory machine-readable medium having stored thereon machine-readable instructions executable to cause a machine to perform operations comprising:
determining, via a plug-in of a web browser, that a webmail user interface associated with a user webmail account with a third-party webmail provider is accessed by the web browser of a user device, wherein the user webmail account includes an email inbox comprising a plurality of email messages, and wherein the webmail user interface presents at least a portion of the plurality of email messages included in the email inbox;
in response to the determining, providing, using the plug-in of the web browser on the webmail user interface, a user interface element for activating a marketplace view within the webmail user interface;
accessing, using user authentication information associated with the user webmail account, the plurality of email messages included in the email inbox of the user webmail account;
determining, from the plurality of email messages included in the email inbox of the user webmail account, a subset of email messages related to a set of deal offers;
extracting deal offer information from the subset of email messages;
generating a plurality of reference files based on the extracted deal offer information, wherein each reference file in the plurality of reference files comprises deal offer information extracted from a corresponding email message from the subset of email messages;
generating the marketplace view based on the extracted deal offer information, wherein the marketplace view interactive graphical elements representing the set of deal offers associated with the subset of email messages, wherein a selection of one of the interactive graphical elements redirects the web browser to a merchant webpage for purchasing a product or a service based on a deal offer represented by the interactive graphical element;
in response to receiving a selection of the user interface element, presenting, on the web browser, the marketplace view;
receiving search criteria via the marketplace view;
querying the plurality of reference files based on the search criteria to identify one or more email messages from the subset of email messages that satisfy the search criteria; and
modifying the marketplace view to present the one or more email messages based on the search criteria.

14. The non-transitory machine-readable medium of claim 13, wherein the operations further comprise:
receiving, from the user, the authentication information associated with the user webmail account prior to the determining that the webmail user interface associated with the user webmail account with the third-party webmail provider is displayed on the web browser of the user device.

15. The non-transitory machine-readable medium of claim 13, wherein the operations further comprise:
receiving a selection of account configuration options related to deal offer criteria, wherein the subset of email messages is determined from the plurality of email messages further based on the account configuration options.

16. The non-transitory machine-readable medium of claim 13, wherein the deal offer information is extracted from each of the subset of email messages corresponds to a particular deal offer and comprises a Uniform Resource Locator (URL) link associated with a merchant offering the particular deal offer, and wherein the operations further comprise generating an interactive graphical element representing the particular deal offer based at least in part on the URL link.

17. The non-transitory machine-readable medium of claim 13, wherein the plurality of email messages included in the email inbox associated with the user webmail account is accessed from a third-party webmail provider server associated with the third-party webmail provider.

18. The system of claim 1, wherein the plurality of email messages included in the email inbox associated with the user webmail account is accessed from a third-party webmail provider server associated with the third-party webmail provider.

19. The method of claim 9, wherein the plurality of email messages included in the email inbox associated with the user webmail account is accessed from a third-party webmail provider server associated with the third-party webmail provider.

20. The method of claim 9, wherein the marketplace view further includes a search bar for conducting a search within the set of deal offers, and wherein the search criteria are received via the search bar.

\* \* \* \* \*